US006385463B1

(12) United States Patent
Lieberman et al.

(10) Patent No.: US 6,385,463 B1
(45) Date of Patent: May 7, 2002

(54) WIRELESS COMMUNICATION DEVICE WITH DETACHABLE FLIP KEYBOARD

(75) Inventors: Mark D. Lieberman; Anthony Blow, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/427,893

(22) Filed: Oct. 26, 1999

(51) Int. Cl.$^7$ ................................................. H04Q 7/20
(52) U.S. Cl. ........................... 455/557; 455/90; 455/556
(58) Field of Search ........................... 455/90, 95, 575, 455/556, 557

(56) References Cited

U.S. PATENT DOCUMENTS

| | | | | |
|---|---|---|---|---|
| 4,852,146 A | * | 7/1989 | Hathcock et al. | 379/58 |
| 5,101,736 A | * | 4/1992 | Bommarito et al. | 108/7 |
| 5,623,881 A | * | 4/1997 | Huang | 108/50 |
| 5,625,673 A | * | 4/1997 | Grewe et al. | 379/61 |
| 5,845,203 A | * | 12/1998 | LaDue | 455/414 |
| 5,896,575 A | * | 4/1999 | Higginbotham et al. | 455/566 |
| 6,052,576 A | * | 4/2000 | Lambourg | 455/410 |
| 6,115,616 A | * | 9/2000 | Halperin et al. | 455/557 |
| 6,206,495 B1 | * | 3/2001 | Peterson | 313/283 |

* cited by examiner

Primary Examiner—Daniel Hunter
Assistant Examiner—Thuan T. Nguyen
(74) Attorney, Agent, or Firm—Philip R. Wadsworth; Charles D. Brown; George C. Pappas

(57) ABSTRACT

A wireless communication device (101) is coupled to an external keyboard (126) through an input/output (I/O) connector (128) mounted on the housing of the wireless communication device (101). The external keyboard (126) includes individual keys for alphabetic characters and numeric characters to permit the easy entry of alphanumeric text for text messaging transmissions by the wireless communication device (101). The keyboard may include a keyboard body (138) with an aperture (144) size to receive and retain the wireless communication device. The I/O connector (128) on the wireless communication device (101) mates with a corresponding keyboard connector (129) located within the aperture (144) of the keyboard body (138). The keyboard (126) may be rotatably mounted to the keyboard housing to permit activation of the keyboard by the user and may be rotated into an open configuration to expose the keypad (122) of the wireless communication device (101) to allow activation of the wireless communication device (101) by the user. The keyboard (126) may also be used to functionally replace the keypad (122) on the wireless communication device (101) by selectively activating a portion of the keys on the keyboard (126) to correspond to the keys on the keypad (122). The keyboard body (138) may include a base support element (160) to support the keyboard (126) on a work surface. The base support element (160) also includes a curved portion (164) and a linear portion (166) to allow the base support element (160) to serve as a belt clip.

19 Claims, 4 Drawing Sheets

WIRELESS COMMUNICATION DEVICE WITH DETACHABLE FLIP KEYBOARD

FIELD OF THE INVENTION

The invention is directed generally to a wireless communication device, and more particularly, to a wireless communication device with a detachable keyboard.

BACKGROUND OF THE INVENTION

Wireless communication devices, such as cellular telephones, are widely used as a replacement for conventional telephone systems. In addition to functioning as a replacement for a conventional telephone, wireless communication devices may be used for text messaging. These wireless communication devices, sometimes known as personal communication systems (PCS), require an alphanumeric display to display retrieved text messages. The user must enter text messages using the telephone keypad. Such data entry can be a cumbersome process because the user must activate keys on the keypad multiple times to enter a text message. For example, the numeric keypad 2 is also associated with the alphabetic characters A, B, C. If one also includes lower case characters, the single key on the keypad may represent seven different data entries (i.e., 2, A, B, C, a, b, c). To select the desired alphanumeric text entry for this key, the user must activate the keypad a number of times. As one can appreciate, such text entry is a tedious process. Therefore, it can be appreciated that there is a significant need for a device by which text messages may be entered into a wireless communication device. The present invention provides this and other advantages as will be apparent from the following detailed description in the accompanying Figures.

SUMMARY OF THE INVENTION

The present invention is embodied in a system and method for coupling a detachable keyboard to a wireless communication device, such as a cellular telephone. The wireless communication device has several conventional components, such as a housing, a transceiver contained within the housing, a keypad supported by the housing to control operation of the wireless communication device and an input/output (I/O) connector supported by the housing to permit the connection of an external device. The system also includes a keyboard device coupled to the I/O connector to permit the entry of text data for transmission. In one embodiment, the keyboard device includes a rotatable member coupled to the keyboard device to permit the rotation of the keyboard device while coupled to the I/O connector.

The system also includes an interface circuit contained within the housing of the wireless communication device and coupled to the I/O connector to receive text data from the keyboard device. The interface may be an industry standard interface, such as an RS-232 serial interface, an RS-422 serial interface, RS-449 serial interface or a universal serial bus interface.

In one embodiment, the keyboard device is operable in a first configuration to enter text data and can be rotated with a rotatable member into a second configuration to allow data entry using the keypad. The wireless communication typically includes an audio input device, such as a microphone. The keyboard device may include an aperture positioned in proximity with the audio input device to permit entry of voice data when the keyboard device is coupled to the connector.

In yet another embodiment, the keyboard device may include a base support element extending therefrom to support the keyboard device and the wireless communication device when attached thereto. In another embodiment, the base support has an elongated shape with first and second ends with the first end attached to the keyboard device and the second end separable from the keyboard device and biased against the keyboard device at the second end, whereby the base support element functions as a belt clip.

DETAILED DESCRIPTION OF THE PREFERRED EMBODIMENTS

The present invention combines an alphanumeric keyboard with a wireless communication device, such as a cellular telephone, and functions to allow the user to enter text data using the keyboard rather than requiring the user to enter text data using the numeric keypad on the wireless communication device.

As those skilled in the art can appreciate, some wireless communication systems provide for short messaging services (SMS) data. With SMS capability, a user may send and receive text messages or email. The operation of SMS wireless communication systems is well known in the art and need not be described herein. Rather, the present invention focuses on a convenient technique for attaching a keyboard to a wireless communication device to simplify the data entry process.

Figure 1:
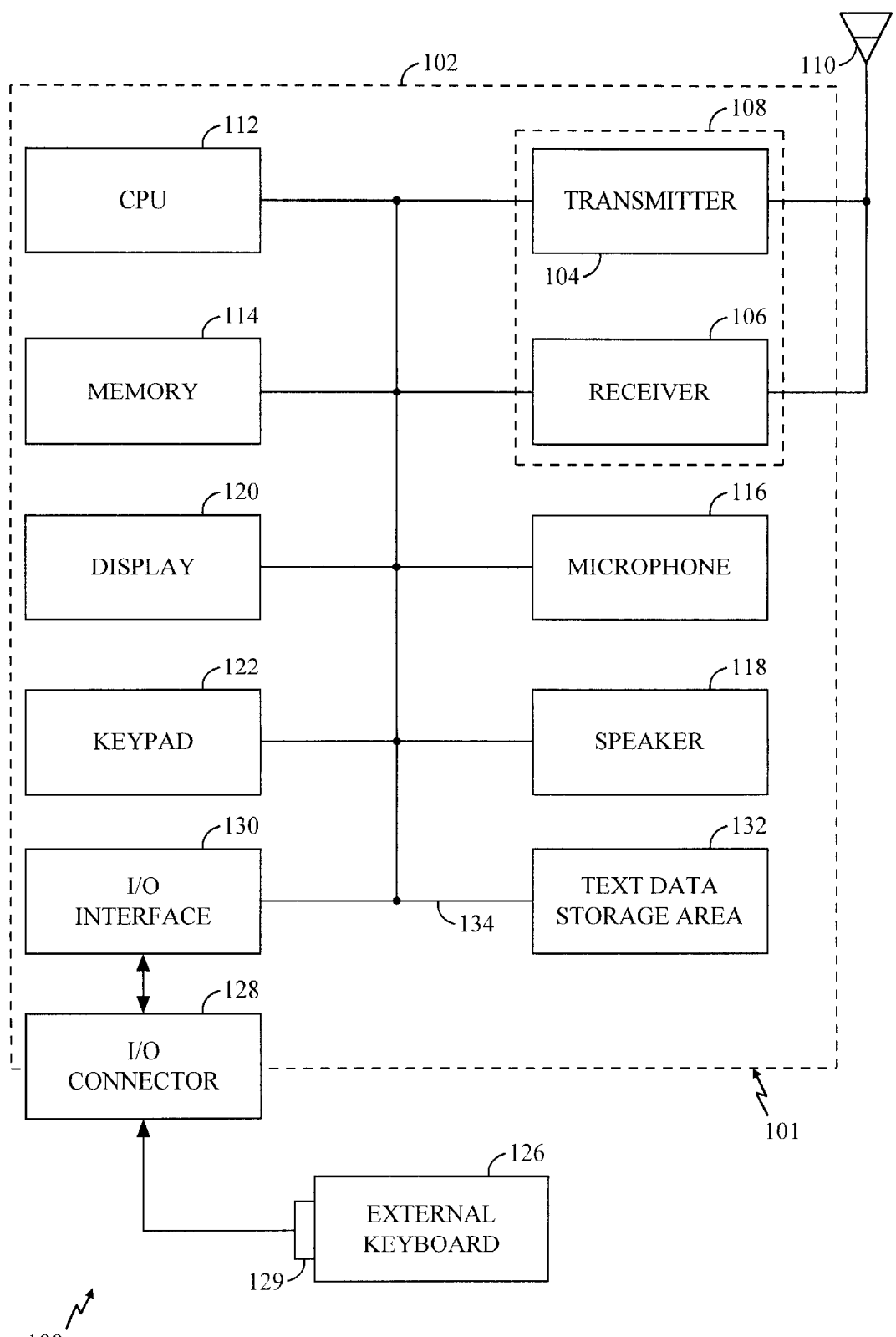
FIG. 1 is a functional block diagram of the system of the present invention.

The present invention is embodied in a system 100 illustrated in the functional block diagram of FIG. 1. The system 100 is incorporated into a wireless communication device 101, which may be embodied in a cellular telephone. The system 100 includes a housing 102 that contains a transmitter 104 and a receiver 106 to allow transmission and reception of data, such as audio communications and text messages, between the system 100 and a remote location, such as a cell site controller (not shown). The transmitter 104 and the receiver 106 may be combined into a transceiver 108.

An antenna 110 is attached to the housing 102 and is electrically coupled to the transceiver 108. The operation of the transmitter 104, receiver 106, and antenna 110 is well known in the art and need not be described herein. Although described herein as a cellular telephone, the principles of the present invention are applicable to a variety of wireless communication devices including, but not limited to, cellular/PCS, radio telephone, conventional radio, and the like. Accordingly, the present invention is not limited by the specific form of wireless communication device.

The wireless communication device 101 also includes a central processing unit (CPU) 112, which controls operation of the system 100. The CPU 112 may perform all the tasks involved in the operation of the system 100, or only a portion of them, where the remaining tasks are delegated to other processing units included in the system 100. For example, the wireless communication device 101 includes, in addition to the CPU 112, an external keyboard 126 that controls the entry, encoding and transfer of encoded data to the wireless communication device. The operation of the keyboard 126 will be described in greater detail below.

The wireless communication device 101 further includes a memory 114 which may include both read-only memory (ROM) and random access memory (RAM). A portion of the memory 114 may also include non-volatile random access memory to store information that must be present upon powering the wireless communication device 101. The memory 114 is generally used to store instructions and data for processing by the CPU 112.

The wireless communication device 101 also includes an audio input device, such as a microphone 116 and an audio output device, such as a speaker 118. The microphone 116 and the speaker 118 operate in a conventional manner to provide two-way audio communication using the wireless communication device 101.

The wireless communication device 101 also includes a display 120 to conveniently display user instructions as well as user-entered data, such as destination telephone numbers and alphanumeric text. A keypad 122 is attached to the housing 102 for operation by the user in a conventional manner. The keypad 122 provides a convenient input device by which destination telephone numbers and commands may be entered by the user.

While the keypad 122 may be conveniently used to enter numerical data, the enter of text data using a numeric keypad is difficult. To simplify the text entry process, the system 100 includes the external keyboard 126. In an exemplary embodiment, the keyboard 126 is configured with the same key positions as a conventional computer or typewriter keyboard (sometimes referred to as a "QWERTY" keyboard). The term QWERTY refers to the individual characters in the top line of the keypad starting at the left side. Those skilled in the art can appreciate that other keyboard configurations may also be used for the keyboard 126. The advantage of the keyboard 126 is that each alphabetic character has its own key. In addition, a shift key (not shown) may be used to enter the corresponding upper case characters. This eliminates the need to activate a key on the keypad 122 multiple times to enter a single character.

The keyboard 126 is coupled to the wireless communication device 101 through an I/O connector 128. FIG. 1 illustrates the I/O connector 128 as coupled to and supported by the housing 102 such that a portion of the I/O connector 128 is external to the housing to permit connection of the keyboard 126. The I/O connector 128 is coupled to the electronic circuitry of the wireless communication device 101 via an I/O interface 130. Although any number of interfaces may be satisfactorily used as the I/O interface 130, it is convenient to use an industry standard interface, such as an RS-232 serial interface, RS-422 serial interface, and RS-449 serial interface or the like. Alternatively, a universal serial bus (USB) interface or a parallel interface may also be conveniently used to implement the I/O interface 130. The present invention is not limited by the specific form of the I/O interface 130. With the keyboard 126 coupled to the wireless communication device 101 via I/O connector 128 and I/O interface 130, the user may conveniently enter alphanumeric text data for an email, text message or the like. As previously noted, this data may be transmitted using standard SMS protocols.

When the user enters alphanumeric text to data using the keyboard 126, the user-entered data may be conveniently stored in a text data storage area 132. The text data storage area 132 may be part of the memory 114, or may be a separate storage area. The user enters the desired alphanumeric text using the keyboard 126 and the system 100 stores the user-entered text data in the text data 132. When the message has been completed, the user may transmit the text message using the transmitter 104. As one skilled in the art can appreciate, the keyboard 126 simplifies the text entry process when compared to the cumbersome operation of the keypad 122 to enter text data, such as alphabetic text.

The various components of system 100 are coupled together by a bus system 134 of the wireless communication device 101, which may include a power bus, control bus, and status signal bus in addition to a data bus. However, for the sake of clarity, the various buses are illustrated in FIG. 1 as the bus system 134.

FIG. 1 illustrates the I/O connector 128 as coupled only to the I/O interface 130 in the wireless communication device 101. However, those skilled in the art can appreciate that the I/O connector 128 may also be coupled directly to the bus system 134. For example, the I/O connector 128 may include electrical connections to the keypad 122. In addition, the I/O connector 128 may be coupled to the power bus so that the wireless communication device 101 supplies electrical power to the keyboard 126.

In operation, the keypad 122 may be used for normal operation of the wireless communication device 101. That is, the keypad 122 may be used to enter destination telephone numbers and control other functions, such as recalling data from a phone book storage area (not shown). When the wireless communication device 101 coupled to the keyboard 126, the keyboard may be used to enter text data for transmission by the transmitter 104. Alternatively, the keyboard 126 my also be used as a replacement for the keypad 122. For example, the keyboard 126 may be used enter destination telephone numbers, recall data from the phone book storage area, and the like.

Figure 2:
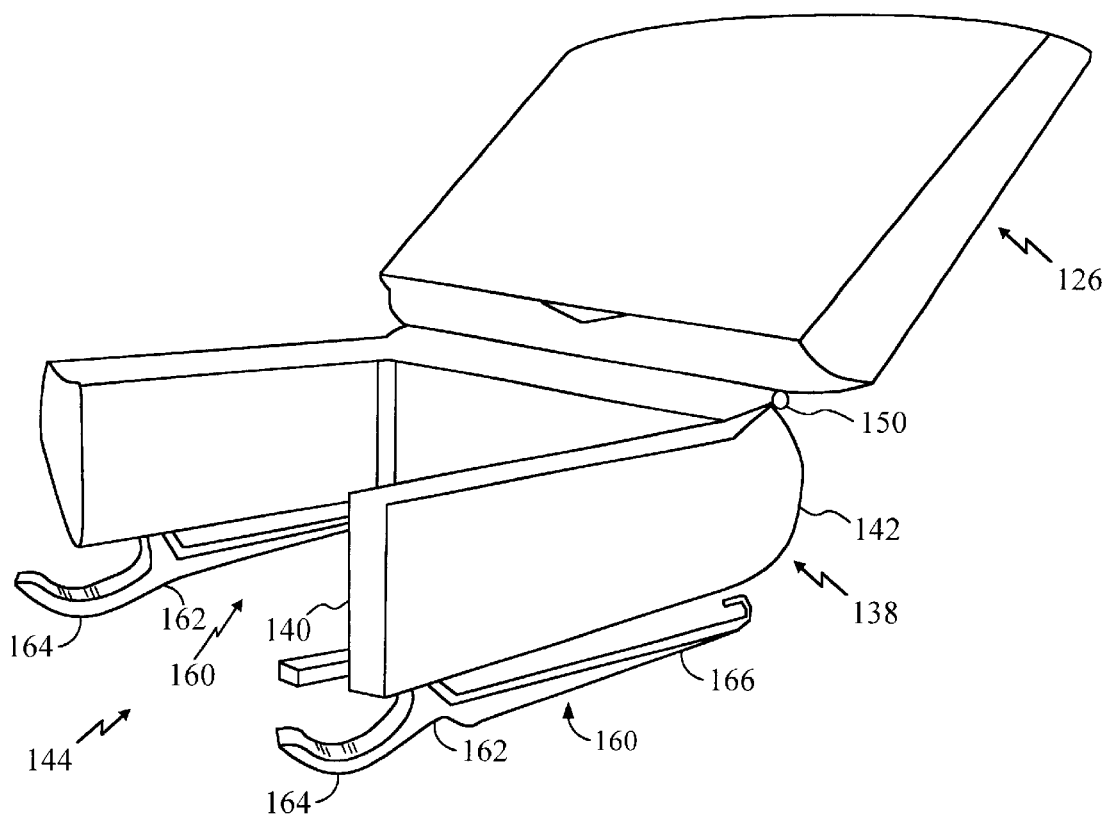
FIG. 2 is a rear perspective view of the keyboard device without the wireless communication device attached thereto.

Various aspects of the system 100 are illustrated in additional figures. For example, FIG. 2 is a perspective view of the keyboard 126 and illustrates a keyboard body 138 having first and seconds ends 140 and 142, respectively. The first end 140 is open and defines an aperture 144 to receive the wireless communication device 101. As the wireless communication device 101 is inserted within the aperture 144, the I/O connector 128 conveniently mates with a keyboard connector 129 (see FIG. 1), which is located at the second end 142 of the keyboard body 138. Those skilled in the art can appreciate that the size of the keyboard body 138, the size and shape of the aperture 144 and the keyboard connector 129 may be selected to correspond to any size, shape and connector type on the wireless communication device 101. Accordingly, the present invention is not limited to the specific design illustrated in FIGS. 2–4.

Alternatively, the keyboard connector 129 may be coupled to an electrical cable (not shown) that is coupled to the I/O connector 128. This eliminates the need for the keyboard body 138 and aperture 144 to be sized to receive and connect with the wireless communication device 101. However, the convenience of the aperture size to receive the wireless communication device 101 and the keyboard connector 129 eliminate the need for any wire cable and allow the wireless communication device 101 to be easily inserted into the keyboard body 138.

Figure 3:
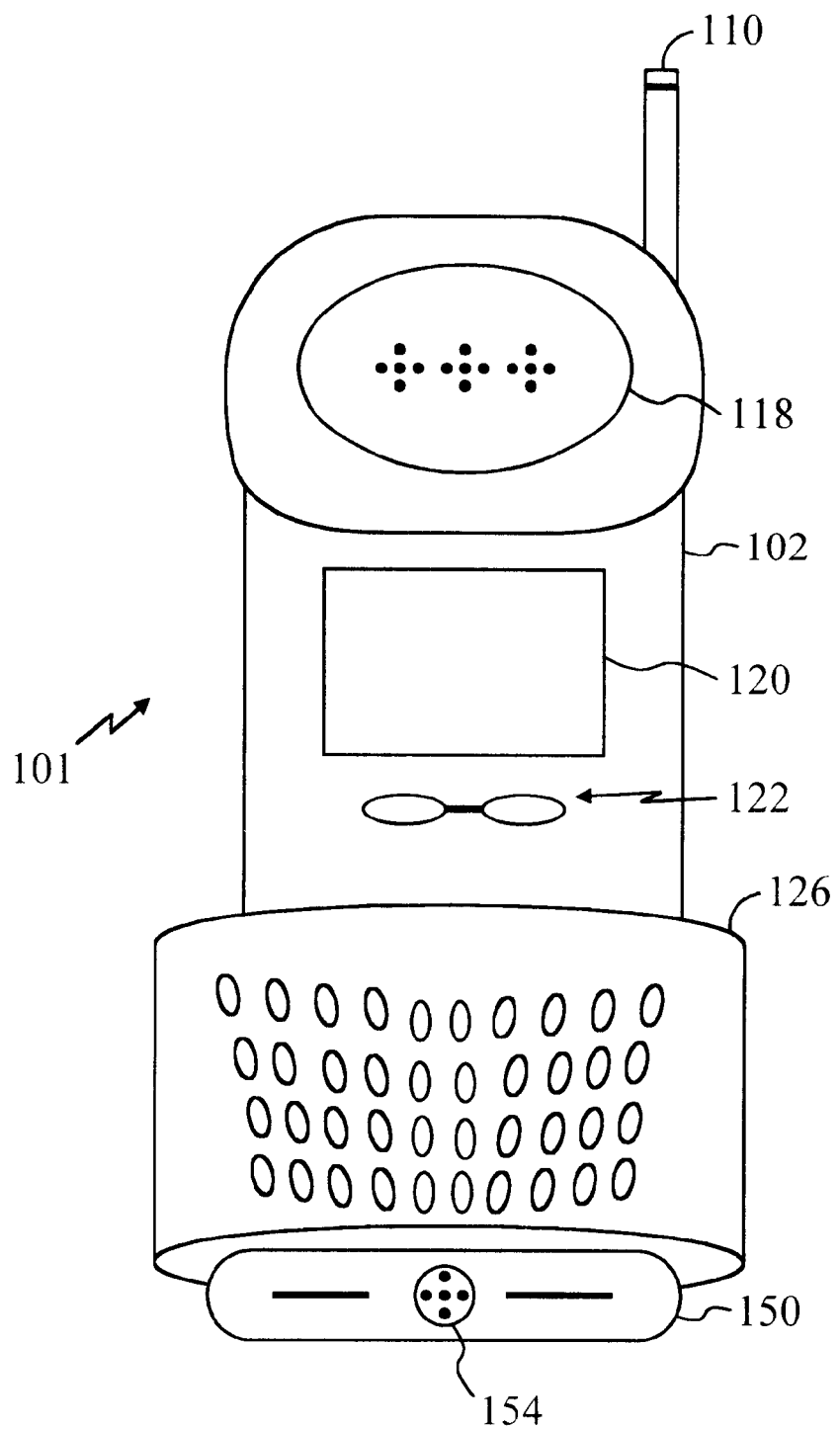
FIG. 3 is a top plan view of the keyboard device attached to the wireless communication device.
Figure 4:
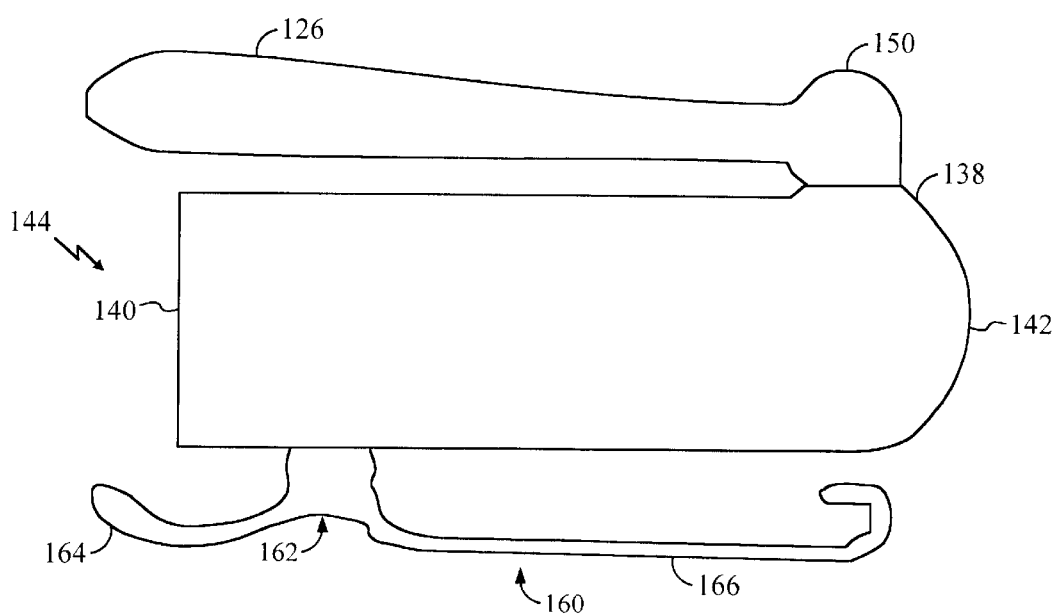
FIG. 4 is a left side elevational view of the keyboard device without the wireless communication device attached thereto with the keyboard in the operating position.

The keyboard 126 is coupled to the keyboard body 138 by a rotatable member 150, such as a hinge. The rotatable member 150 allows the keyboard 126 to be placed in position over the keypad 122 to enter alphanumeric text. This is illustrated in FIG. 3 where the keyboard 126 overlays the keypad 122. The user may conveniently operate the keys of the keyboard 126 to enter an alphanumeric text message. To operate the keys of the keypad 122, the user simply rotates the keyboard 126, such as illustrated in FIG. 2, to expose the keypad 122. Thus, the keyboard 126 may be rotated into a first operational position, illustrated in FIG. 2, to expose the keypad 122 and allow the user to use the keypad in a conventional manner to control the operation of the wireless communication device 101. The keyboard 126 may be subsequently rotated into a second operational position, illustrated in FIG. 3, the keyboard 126 to permit the keys to be selectively activated by the user to enter a text message.

Alternatively, the keyboard 126 may be operated in a manner similar to the keypad 122. For example, a control key on the keyboard 126 may be used to place the keyboard 126 in a first operational mode. In the first operational mode, a 3×4 matrix of keys on the keyboard 126 are activated and function in a manner identical to the 3×4 matrix of keys on a conventional wireless communication device.

In a second mode of operation, the keyboard 126 functions as a conventional keyboard to allow the entry alphanumeric text, which is stored in the text data storage area 132 (see FIG. 1) as described above. The system 100 may be toggled back and forth between the first and second modes of operation through the activation of selected keys on the keyboard 126. The keys of the keyboard 126 may be conveniently labeled to indicate dual-functionality in the two different modes of operation.

Alternatively, the keyboard 126 may always operate in the second operational mode when the keyboard 126 is in the first operational position and overlays the keypad 122. A micro-sensing switch (not shown) within the rotatable member 150 detects the position of the keyboard in the open operational position or the closed operational position. When the keyboard 126 is rotated into the open operational position, the keyboard is activated for operation to replace the keypad 122 and functions in the manner described above. Thus, the system may be readily constructed to function as a conventional wireless communication device with the keypad 122 and the external keyboard 126 or may use the keyboard 126 to control all functions of the wireless communication device.

The microphone 116 (see FIG. 1) is typically located in a portion of the body 102 spaced apart from the speaker 118. To permit operation of the wireless communication device 101 while coupled to the keyboard 126, the keyboard 126 includes a microphone aperture 154 positioned proximate the microphone 116 to allow detection of the user voice by the microphone. Those skilled in the art will appreciate that the size, shape and location of the microphone aperture 154 can be altered to accommodate microphone locations in various positions on the wireless communication device 101.

The keyboard body 138 may also include additional elements to allow the system to be operated on a working surface such as desktop, or attached to the user's belt. This is best illustrated best in FIG. 4 where the keyboard body 138 includes base support elements 160 extending from the keyboard body. The base support elements 160 are coupled to the keyboard body 138 at points of attachment 162. From each point of attachment 162 a curved portion 164 extends in a first direction to form a first end and a linear portion 166 extends in the opposite direction to form a second end of the base support element. The curved portions 164 and the linear portions 166 are arranged to maintain the keyboard 126 in a relatively horizontal position when the keyboard body 138 is placed on a working surface, such as a desk. This allows the user to activate the keyboard 126 with both hands without the need to hold the system 100 in one hand. Thus, the base support elements 160 conveniently function as a stand for the keyboard 126 and the attached wireless communication device 101.

The base support elements 160 may also function as a belt clip. For example, the linear portion 166 of each support element 160 may be biased toward the keyboard body second end 142 using a biasing element (not shown) such as a spring mounted at the points of attachment 162 or by plastic molding at the points of connection 162 that biases the linear portion 166 at the second end toward the keyboard body 138. Such biasing tends to push the linear portion 166 of the base support element toward the keyboard body second end 142 thus retaining the keyboard body on the user's belt clip. The user may press the curved portion 164 of the base support element 160 toward the keyboard body first end 140 to overcome the biasing and create a gap between the linear portion 166 of the base support element 160 and the keyboard body second end 142. When the pressure is released by the user, the biasing element at the point of attachment 162 decreases the gap between the linear portion 166 and the keyboard body 138 thus retaining the keyboard body and attached wireless communication device on the user's belt clip.

It is to be understood that, even though various embodiments and advantages of the present invention have been set forth in the foregoing description, the above disclosure is illustrative, and changes may be made in detailed, yet remain within the broad principles of the invention. Therefore, the present invention is to be limited only by the appended claims.

What is claimed is:

1. A wireless communication device, comprising:

a housing;

a transceiver contained within the housing to allow communication with a device remote from the wireless communication device;

a keypad, supported by the housing, to control operation of the wireless communication device;

a connector, supported by the housing, to permit the connection of an external device;

a keyboard device coupled to the connector to permit entry of text data for transmission;

a rotatable member coupled to the keyboard device to permit rotation of the keyboard device while coupled to the connector; and a base support element extending from the keyboard device to support the keyboard device and the wireless communication device.

2. The device of claim 1, further comprising an interface circuit contained within the housing and coupled to the connector, the interface circuit receiving the text data from the keyboard device.

3. The device of claim 2 wherein the interface circuit is an industry standard interface comprising a selected one of an RS-232 serial interface, an RS-422 serial interface, an RS-449 serial interface, and a universal serial bus (USB) interface.

4. The device of claim 1 wherein the keyboard device is operable in a first configuration to enter the text data, and can be rotated with the rotatable member into a second configuration to allow data entry using the keypad.

5. The device of claim 1, further comprising an audio input device supported by the housing to permit entry of voice data by a user, the keyboard device including an aperture positioned in proximity with the audio input device to permit entry of the voice data when the keyboard device is coupled to the connector.

6. A wireless communication device, comprising:
   a housing;
   a transceiver contained within the housing to allow communication with a device remote from the wireless communication device;
   a keypad, supported by the housing, to control operation of the wireless communication device;
   a connector, supported by the housing, to permit the connection of an external device;
   a keyboard device coupled to the connector to permit entry of text data for transmission;
   a rotatable member coupled to the keyboard device to permit rotation of the keyboard device while coupled to the connector; and
   a base support element extending from the keyboard device, the base support element having an elongated shape with first and second ends and attached to the keyboard device proximate the first end and the second end being separable from the keyboard device and biased against the keyboard device at the second end, whereby the base support element also functions as a beltclip.

7. The device of claim 1, wherein the keyboard device has first and second modes of operation, the keyboard device functioning as an input device to enter alphanumeric text data in the first mode and functioning as a replacement for the keypad in the second mode to enter data and control operation of the wireless communication device.

8. A keyboard attachment for use with a wireless communication device having a connector for the connection of an external device, the keyboard attachment comprising:
   a keyboard body having first and second ends, the first end being open and having sidewalls to define an aperture sized to receive the wireless communication device;
   a mating connector located proximate the keyboard body second end to couple the keyboard attachment to the wireless communication device connector;
   a keyboard operable by a user to enter text data for transmission by the wireless communication device, the text data being transferred to the wireless communication device via the mating connector and file connector on the wireless communication device; and
   a base support element extending from the keyboard body to support the keyboard body and the wireless communication device.

9. The keyboard attachment of claim 8, further comprising a rotatable member coupled to the keyboard and the keyboard body to permit the rotation of the keyboard.

10. The keyboard attachment of claim 9 for use with the wireless communication device having a keypad wherein the keyboard is operable in a first configuration to enter the text data, and can be rotated with the rotatable member into a second configuration to allow data entry using the wireless communication device keypad.

11. The keyboard attachment of claim 8, further comprising an interface circuit contained within the keyboard body and coupled to the mating connector, the interface circuit being compatible with the wireless communication device.

12. The keyboard attachment of claim 11 wherein the interface circuit is an industry standard interface comprising a selected one of an RS-232 serial interface, an RS-422 serial interface, an RS-449 serial interface, and a universal serial bus (USB) interface.

13. The keyboard attachment of claim 8 for use with the wireless communication device having an audio input device to permit entry of voice data by a user, the keyboard further comprising an aperture positioned in proximity with the audio input device to permit entry of the voice data when the keyboard attachment is coupled to the wireless communication device.

14. A keyboard attachment for use with a wireless communication device having a connector for the connection of an external device, the keyboard attachment comprising:
   a keyboard body having first and second ends, the first end being open and having sidewalls to define an aperture sized to receive the wireless communication device;
   a mating connector located proximate the keyboard body second end to couple the keyboard attachment to the wireless communication device connector;
   a keyboard operable by a user to enter text data for transmission by the wireless communication device, the text data being transferred to the wireless communication device via the mating connector and the connector on the wireless communication device; and
   a base support element extending from the keyboard body, the base support element having an elongated shape with first and second ends and attached to the keyboard body proximate the first end and the second end being separable from the keyboard body and biased against the keyboard body at the second end, whereby the base support element functions as a beltclip.

15. The keyboard attachment of claim 8 for use with the wireless communication device having a keypad wherein the keyboard has first and second modes of operation, the keyboard functioning as an input device to enter alphanumeric text data in the first mode and functioning as a replacement for the wireless communication device keypad in the second mode to enter data and control operation of the wireless communication device.

16. A method for data entry into a wireless communication device having a connector for the connection of an external device, the method comprising:
   coupling the wireless communication device to a keyboard body, the keyboard body having first and second ends, the first end being open and having sidewalls to define an aperture sized to receive the wireless communication device wherein coupling the wireless communication device to a keyboard body comprises inserting the wireless communication device into the keyboard body aperture;
   coupling a mating connector located proximate the keyboard body second end to the wireless communication device connector;
   detecting user activation of a keyboard coupled to the keyboard body to enter text data for transmission by the wireless communication device;
   transferring the text data to the wireless communication device via the mating connector and the connector on the wireless communication device; and
   resting the keyboard body on a working surface by providing a base support element extending from the keyboard body to support the keyboard body and the wireless communication device on the working surface.

17. The method of claim 16 for use with the wireless communication device having a keypad wherein the keyboard is operable in a first configuration to enter the text data, the method further comprising rotating the keyboard into a second configuration to allow data entry using the wireless communication device keypad.

18. A method for data entry into a wireless communication device having a connector for the connection of an external device, the method comprising:

coupling the wireless communication device to a keyboard body, the keyboard body having fist and second ends, the first end being open and having sidewalls to define an aperture sized to receive the wireless communication device wherein coupling the wireless communication device to a keyboard body comprises inserting the wireless communication device into the keyboard body aperture;

coupling a mating connector located proximate the keyboard body second end to the wireless communication device connector;

detecting user activation of a keyboard coupled to the keyboard body to enter text data for transmission by the wireless communication device;

transferring the text data to the wireless communication device via the mating connector and the connector on the wireless communication device; and attaching the keyboard body and attached wireless communication device to a beltclip by providing a base element extending from the keyboard body, the base support element having an elongated shape with first and second ends and attached to the keyboard body proximate the fist end and the second end being separable from the keyboard body and biased against the keyboard body at the second end, whereby the base support element functions as a beltclip.

19. The method of claim 16 for use with the wireless communication device having a keypad wherein the keyboard has first and second modes of operation, the keyboard functioning as an input device to enter alphanumeric text data in the first mode and functioning as a replacement for the wireless communication device keypad in the second mode to enter data and control operation of the wireless communication device.

* * * * *